United States Patent
Yoon et al.

(10) Patent No.: US 12,382,152 B2
(45) Date of Patent: Aug. 5, 2025

(54) CAMERA MODULE HAVING A SPACER WITH FOUR PLATE PARTS

(71) Applicant: LG INNOTEK CO., LTD., Seoul (KR)

(72) Inventors: Kyeong Mok Yoon, Seoul (KR); Min Woo Lee, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 152 days.

(21) Appl. No.: 18/246,626

(22) PCT Filed: Oct. 12, 2021

(86) PCT No.: PCT/KR2021/014061
§ 371 (c)(1),
(2) Date: Mar. 24, 2023

(87) PCT Pub. No.: WO2022/080841
PCT Pub. Date: Apr. 21, 2022

(65) Prior Publication Data
US 2023/0362466 A1  Nov. 9, 2023

(30) Foreign Application Priority Data
Oct. 14, 2020  (KR) .......................... 10-2020-0132518

(51) Int. Cl.
*H04N 23/51* (2023.01)
*G03B 17/02* (2021.01)
*H04N 23/55* (2023.01)

(52) U.S. Cl.
CPC ............. *H04N 23/51* (2023.01); *G03B 17/02* (2013.01); *H04N 23/55* (2023.01)

(58) Field of Classification Search
CPC ........ H04N 23/51; H04N 23/55; H04N 23/52; H04N 23/54; G03B 17/02; G03B 17/55; G03B 30/00
See application file for complete search history.

(56) References Cited

U.S. PATENT DOCUMENTS

2006/0171704 A1*  8/2006  Bingle ................... H04N 23/55
                                                                   396/419
2011/0298925 A1*  12/2011  Inoue .................... H04N 23/52
                                                                   348/148
(Continued)

FOREIGN PATENT DOCUMENTS

KR  10-2017-0084550 A  7/2017
KR  10-2018-0059063 A  6/2018
(Continued)

OTHER PUBLICATIONS

International Search Report dated Jan. 24, 2022 in International Application No. PCT/KR2021/014061.
(Continued)

*Primary Examiner* — Ahmed A Berhan
(74) *Attorney, Agent, or Firm* — Saliwanchik, Lloyd & Eisenschenk

(57) ABSTRACT

This camera module comprises: a first housing including a lens; a second housing coupled to the first housing; a substrate assembly positioned inside a space formed by the coupling of the first housing and the second housing; and a shield can positioned inside the second housing. The substrate assembly includes at least one substrate and a spacer positioned outside the substrate, wherein the spacer includes a plurality of protrusions that protrude from the outer surface and contact the shield can.

19 Claims, 6 Drawing Sheets

(56) References Cited

U.S. PATENT DOCUMENTS

2018/0295262 A1    10/2018  Dellock et al.
2019/0028620 A1*   1/2019   Park ...................... H04N 23/55
2019/0227411 A1*   7/2019   Park ...................... H04N 23/52

FOREIGN PATENT DOCUMENTS

KR    10-2019-0004457 A    1/2019
KR    10-2020-0014504 A    2/2020

OTHER PUBLICATIONS

Supplementary European Search Report dated Oct. 21, 2024 in European Application No. 21880488.8.

\* cited by examiner

CAMERA MODULE HAVING A SPACER WITH FOUR PLATE PARTS

CROSS-REFERENCE TO RELATED APPLICATIONS

This application is the U.S. national stage application of International Patent Application No. PCT/KR2021/014061, filed Oct. 12, 2021, which claims the benefit under 35 U.S.C. § 119 of Korean Application No. 10-2020-0132518, filed Oct. 14, 2020, the disclosures of each of which are incorporated herein by reference in their entirety.

TECHNICAL FIELD

The present embodiment relates to a camera module.

BACKGROUND ART

Recently, a subminiature camera module has been developed, and the miniature camera module is widely used in small electronic products such as smart phones, laptop computers, and game consoles.

As the spread of automobiles has become popular, subminiature cameras are widely used not only in small electronic products but also in vehicles. For example, black box cameras for vehicle protection or objective data on traffic accidents, rear surveillance cameras enabling the driver to monitor blind spots at the rear of the vehicle through a screen to ensure safety when reversing the vehicle, ambient detection cameras capable of monitoring the surroundings of the vehicle, and the like are provided.

The camera may be provided with a lens, a lens holder accommodating the lens, an image sensor converting an image of a subject collected in the lens into an electrical signal, and a printed circuit board on which the image sensor is mounted. The housing forming the outer appearance of the camera has a structure in which the entire region is sealed to inhibit internal components from being contaminated by foreign substances including moisture.

DETAILED DESCRIPTION OF THE INVENTION

Technical Subject

The present embodiment is to provide a camera module capable of improving heat dissipation efficiency by improving the structure and simplifying the manufacturing process.

Technical Solution

A camera module according to the present embodiment comprises: a first housing including a lens; a second housing being coupled to the first housing; a substrate assembly being disposed inside a space being formed by coupling the first housing and the second housing; and a shield can being disposed inside the second housing, wherein the substrate assembly includes at least one substrate and a spacer being disposed outside the substrate, and wherein the spacer includes a plurality of protrusions being protruded from an outer surface and in contact with the shield can.

The spacer may comprise: a first plate part; a second plate part being disposed adjacent to the first plate part; a third plate part being disposed adjacent to the second plate part and facing the first plate part; and a fourth plate part being disposed adjacent to the third plate part and facing the second plate part.

The protrusion may be respectively disposed in at least three plate parts among the first to fourth plate parts.

The substrate assembly may comprise: a first substrate in which an image sensor is disposed; a second substrate being spaced apart from the first substrate in an optical axis direction and coupled to a connector; and a flexible printed circuit board connecting the first substrate and the second substrate.

The third plate part may include: a first protrusion being protruded from an outer surface, and a first coupling hole being disposed below the first protrusion and penetrating the outer surface from an inner surface to which the side surface of the second substrate is coupled.

At least one among the first to the fourth plate parts may include: a second protrusion being protruded outward from an outer surface; and a third protrusion being disposed below the second protrusion and being protruded outward from an outer surface.

The second plate part includes the second protrusion, and the fourth plate part may include the third protrusion.

Each of the second plate part and the fourth plate part includes: a first region in which the second protrusion is disposed; and a second region being formed below the first region and in which the third protrusion is disposed, wherein the first region may be disposed more inward than the second region to have a step.

The second protrusion and the third protrusion may be disposed to have a step in a direction perpendicular to the optical axis direction.

A camera module according to another embodiment comprises: a first housing including a lens; a second housing being coupled to the first housing; a substrate assembly being disposed inside a space being formed by the coupling of the first housing and the second housing, and a shield can being disposed inside the second housing, wherein the substrate assembly includes at least one substrate and a spacer being disposed outside the substrate, wherein the material of the shield can is formed of a metal material, wherein the material of the second housing is formed of a plastic material, wherein the shield can and the second housing are integrally formed by insert injection, wherein the shield can includes four plate parts, and wherein at least one plate part among the four plate parts includes a plurality of protrusions being in contact with the shield can.

Advantageous Effects

According to the present invention, there is an advantage in that heat dissipation efficiency can be improved by forming a plurality of contact structures between the spacer and the shield can.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

The 'optical axis direction' used below is defined as the optical axis direction of the lens. Meanwhile, the 'optical axis direction' may correspond to 'up and down directions', 'z-axis directions', and the like.

Hereinafter, the present invention will be described in more detail with reference to the accompanying drawings.

Figure 1:
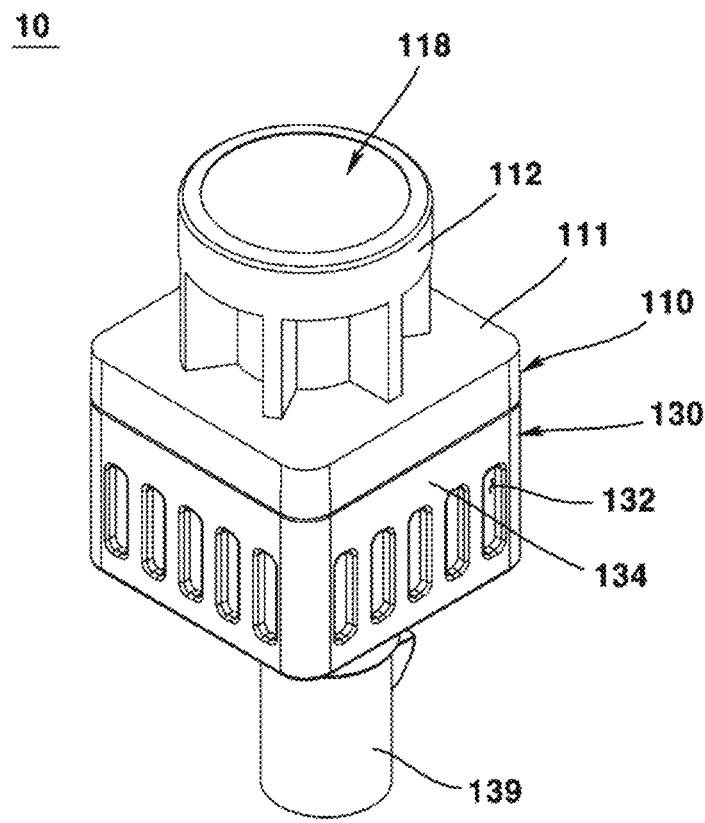
FIG. 1 is a perspective view of a camera module according to an embodiment of the present invention.
Figure 2:
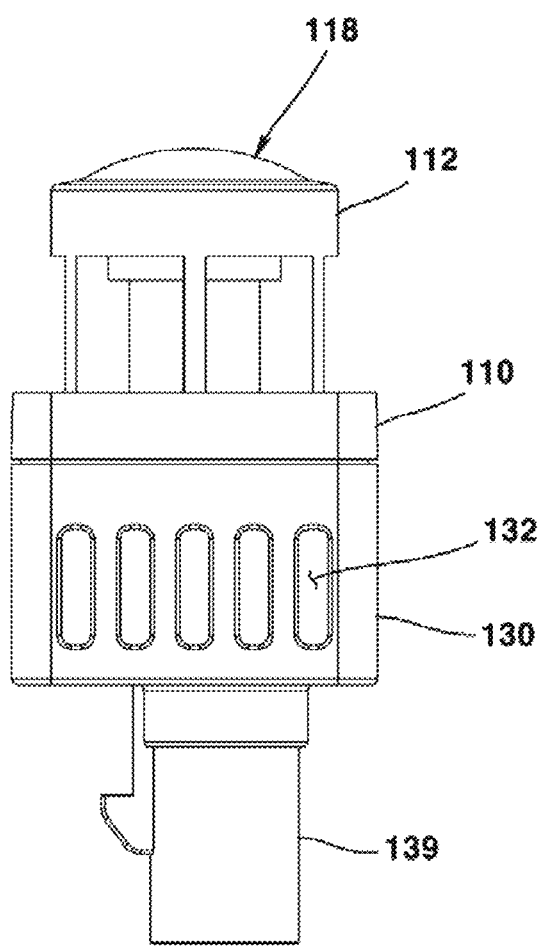
FIG. 2 is a plan view illustrating one side surface of a camera module according to an embodiment of the present invention.
Figure 3:
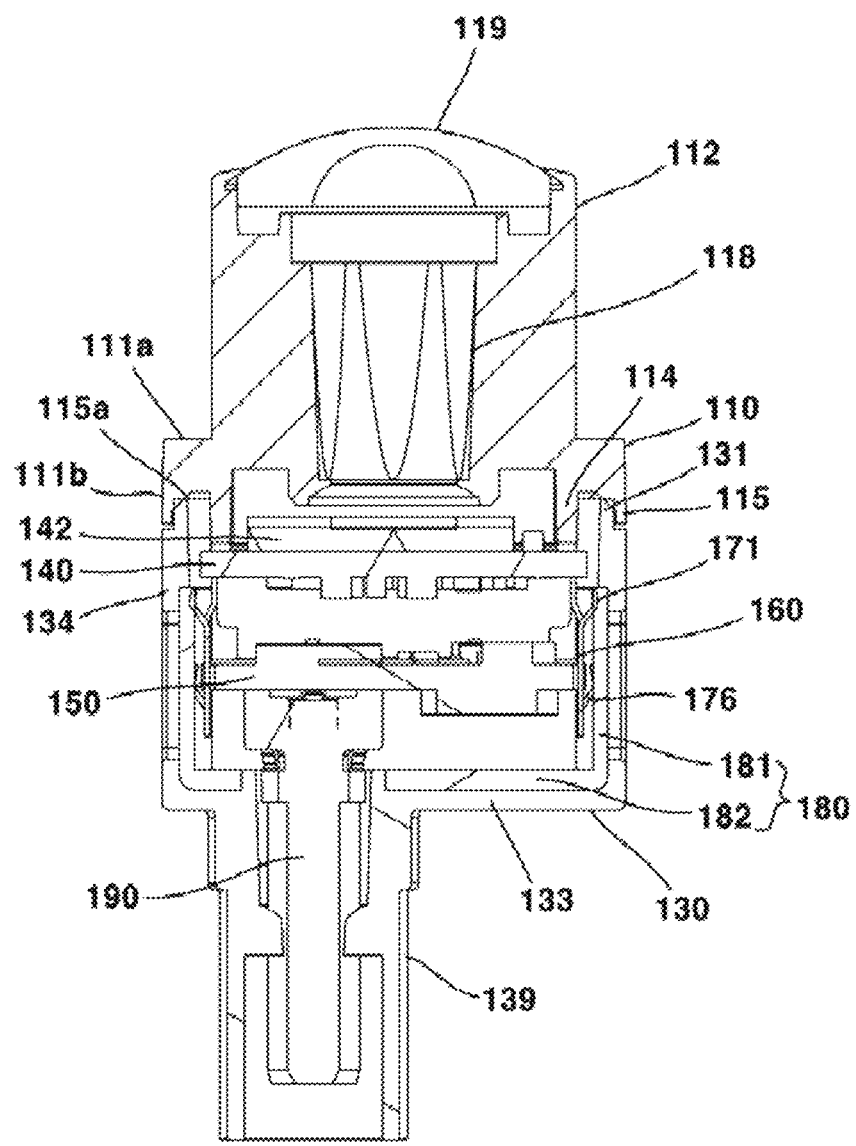
FIG. 3 is a cross-sectional view illustrating a configuration inside a camera module according to an embodiment of the present invention.
Figure 4:
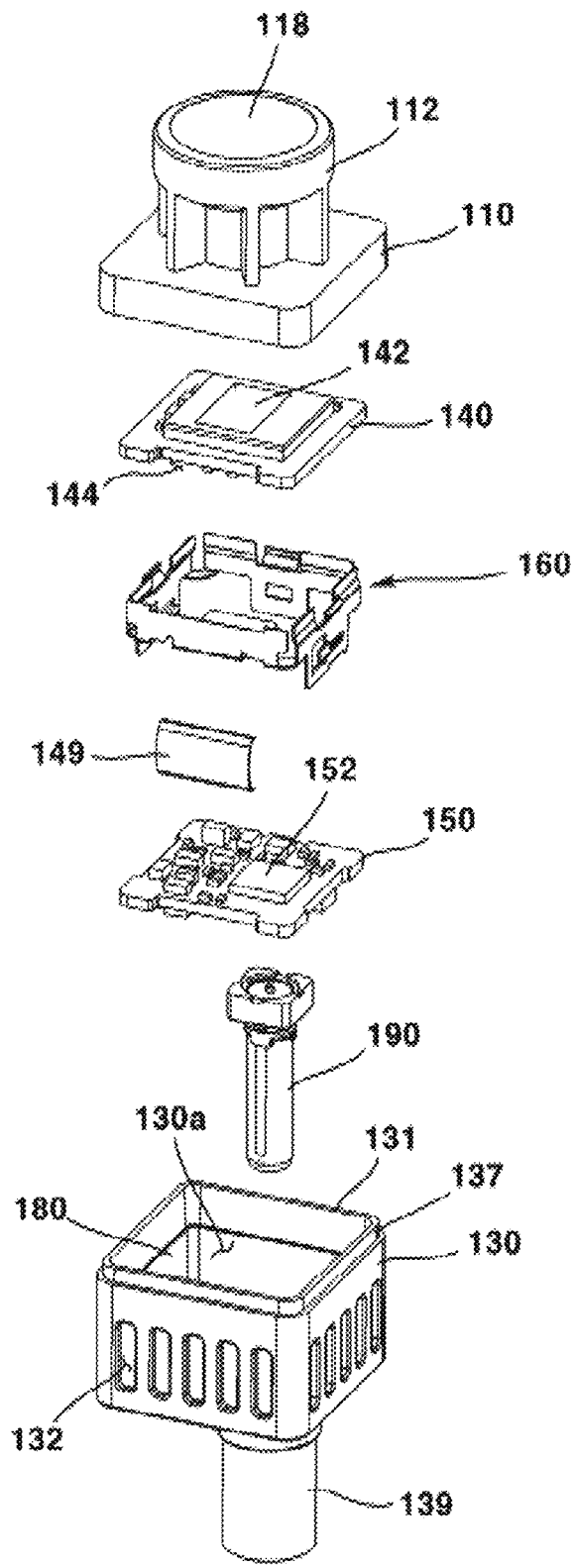
FIG. 4 is an exploded perspective view of a camera module according to an embodiment of the present invention.
Figure 5:
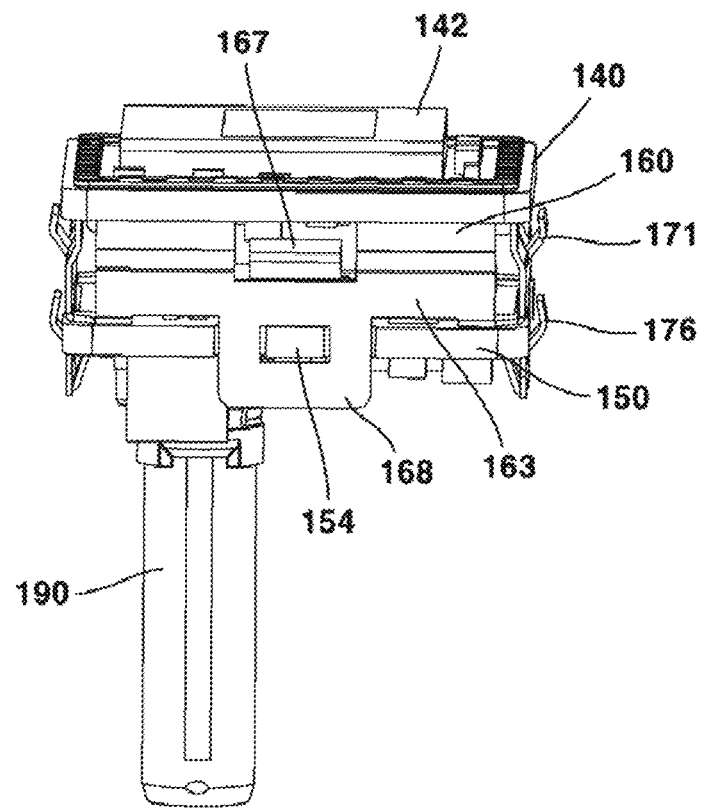
FIG. 5 is a perspective view of a substrate assembly according to an embodiment of the present invention.
Figure 6:
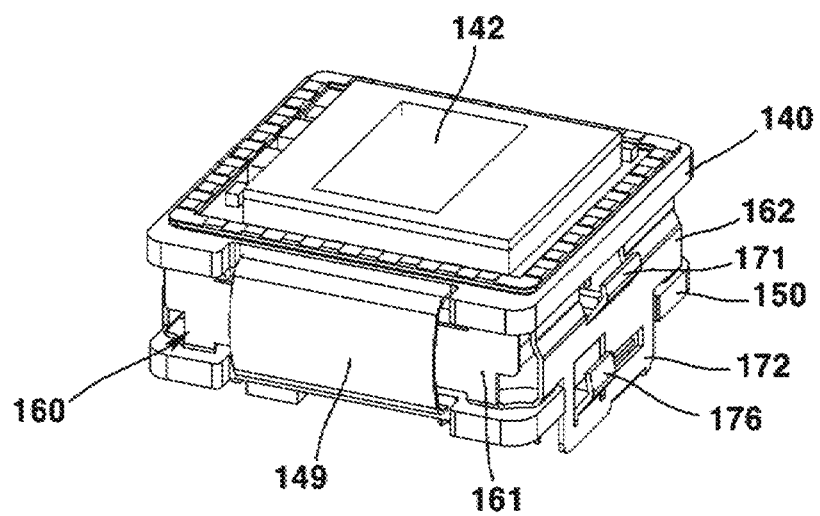
FIG. 6 is a perspective view of a substrate assembly of FIG. 5 illustrated at another angle.
Figure 7:
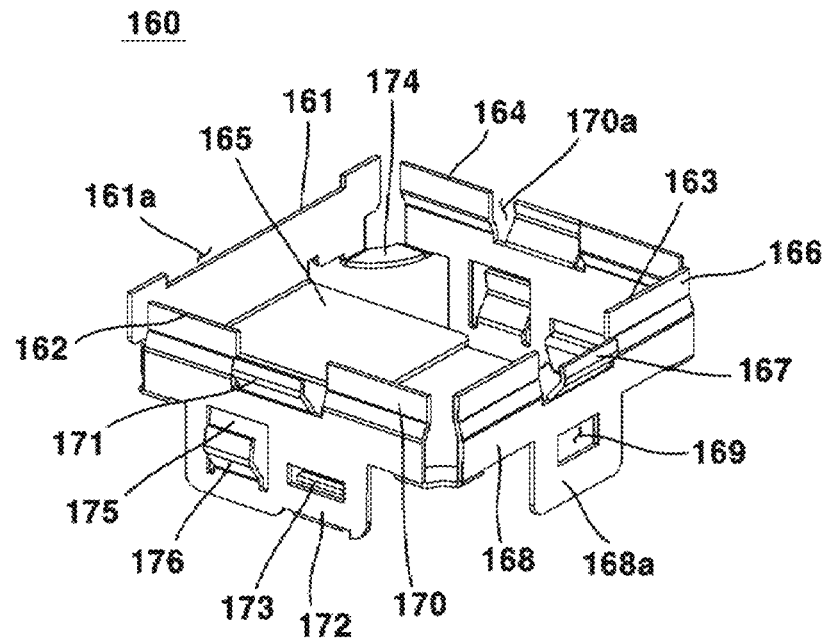
FIG. 7 is a perspective view of a spacer according to an embodiment of the present invention.
Figure 8:
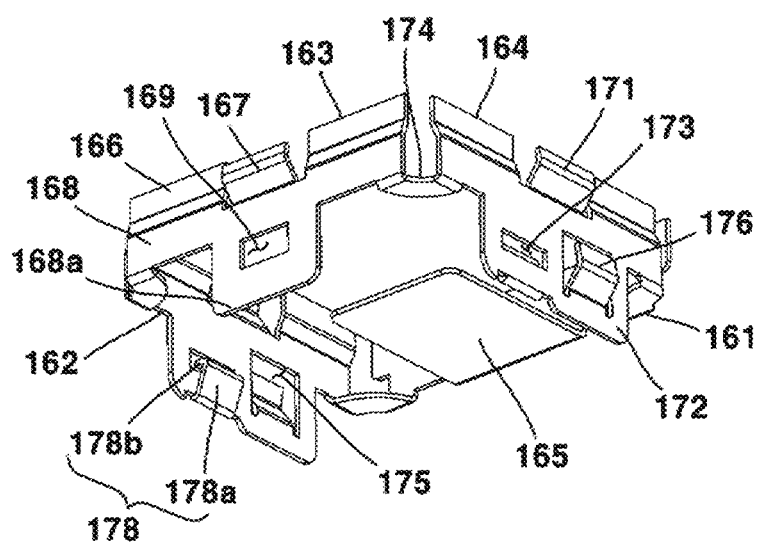
FIG. 8 is a perspective view of a spacer illustrated in FIG. 7 from another angle.

FIG. 1 is a perspective view of a camera module according to an embodiment of the present invention; FIG. 2 is a plan view illustrating one side surface of a camera module according to an embodiment of the present invention; FIG. 3 is a cross-sectional view illustrating a configuration inside a camera module according to an embodiment of the present invention; FIG. 4 is an exploded perspective view of a camera module according to an embodiment of the present invention; FIG. 5 is a perspective view of a substrate assembly according to an embodiment of the present invention; FIG. 6 is a perspective view of a substrate assembly of FIG. 5 illustrated at another angle; FIG. 7 is a perspective view of a spacer according to an embodiment of the present invention; and FIG. 8 is a perspective view of a spacer illustrated in FIG. 7 from another angle.

Referring to FIGS. 1 to 8, the camera module 100 according to an embodiment of the present invention may be a vehicle camera module. The camera module 100 may be coupled to a vehicle. The camera module 100 may be used for any one or more among a front camera, a side camera, a rear camera, and a black box of a vehicle. The camera module 100 may be disposed at a front side of the vehicle. The camera module 100 may be disposed at a rear side of the vehicle. The camera module 100 may be coupled to a windshield of a vehicle. The camera module 100 may be coupled to a front or rear windshield of the vehicle. The camera module 100 may be disposed at a side of the vehicle. The camera module 100 may photograph a subject and output an image in a display (not shown).

The camera module 10 may include a first housing 110. The first housing 110 may be named any one among a front housing, an upper housing, and a first body. The first housing 110 may include a body part 111. The first housing 110 may include a barrel unit 112. The first housing 110 may include a lens 118. The body part 111, the barrel unit 112, and the lens 118 of the first housing 110 may be integrally formed. Any two or more among the body part 111, the barrel unit 112, and the lens 118 of the first housing 110 may be integrally formed. As a modified embodiment, the body part 111, the barrel unit 112 and the lens 118 may be separately formed.

The body part 111 may be coupled to the barrel unit 112. The body part 111 may be integrally formed with the barrel unit 112. The body part 111 may be formed of a plastic material. The body part 111 may be disposed above the second housing 130, which will be described later. The first housing 110 may be coupled to the second housing 130. A lower end of the first housing 110 may be fixed to the second housing 130. The first housing 110 may be coupled to the second housing 130 by any one among ultrasonic welding, laser welding, and thermal welding. As a modified embodiment, the first housing 110 may be coupled to the second housing 130 by an adhesive. The first housing 110 may be coupled to a first substrate 140 of a substrate assembly, which will be described later.

The first housing 110 may be formed in a rectangular shape with an open lower portion. At this time, the corner of the body part 111 may be formed to be rounded. The body part 111 may include an upper plate 111a and a side plate 112b being extended from the upper plate 111a. The upper plate 111a may be formed in a rectangular shape. The upper plate 111a may be extended outward from an outer circumferential surface of the barrel unit 112. The side plate 111b may be extended downward from an outer edge of the upper plate 111a. The side plate 111b may include a plurality of side plates 111b. The side plate 111b may include four side plates. The side plate 111b may be formed in a square plate shape. The side plate 111b may include a first side plate, a second side plate, a third side plate being disposed at an opposite side of the first side plate, and a fourth side plate being disposed at an opposite side of the second side plate. The side plate 111b may include first to fourth corners respectively being disposed between the first to fourth side plates. Each of the first to fourth corners may include a round shape at least in portion.

The first housing 110 may include a first protruded portion 114. The first protruded portion 114 may be protruded downward from a lower surface of the upper plate 111a. The first protruded portion 114 may be disposed at a more inner side than the second protruded portion 115, which will be described later. The first protruded portion 114 may be coupled to the first substrate 140. The first protruded portion 114 may be coupled to an outer edge of the first substrate 140. The first protruded portion 114 may be formed in a shape corresponding to an outer edge of the first substrate 140. A lower end of the first protruded portion 114 may be coupled to the first substrate 140. A lower end of the first protruded portion 114 may be fixed to the first substrate 140 by an adhesive.

A lower end of the first protruded portion 114 may be disposed at a lower side than a lower end of the second protruded portion 115. The protruded length of the first protruded portion 114 in an optical axis direction may be longer than the length of the second protruded portion 115 in an optical axis direction. The maximum length of the first protruded portion 114 in an optical axis direction may be longer than the length of the second protruded portion 115 in an optical axis direction. The first protruded portion 114 may be spaced apart from the second protruded portion 115. The first protruded portion 114 may be spaced apart from the second protruded portion 115 in a direction perpendicular to the optical axis direction. At least a portion of the first protruded portion 114 may face the second protruded portion 115.

The first protruded portion 114 may be protruded more than the side plate 111b. The length of the first protruded portion 114 in an optical axis direction may be longer than the length of the side plate 111b in an optical axis direction. The first protruded portion 114 may comprise: a first-first protruded portion facing the first side plate; a first-second protruded portion facing the second side plate; a first-third protruded portion facing the third side plate; and a first-fourth protruded portion facing the fourth side plate. The first-first to first-fourth protruded portions may be integrally formed. The first protruded portion 114 may be spaced apart from the side plate 111b. The first protruded portion 114 may be spaced apart from the side plate 111b in a direction perpendicular to the optical axis direction.

The first housing 110 may include a second protruded portion 115. The second protruded portion 115 may be protruded from a lower surface of the upper plate 111a. The second protruded portion 115 may be disposed at a more outer side than the first protruded portion 114. The second protruded portion 115 may be coupled to the second housing 130. At least a portion of the second protruded portion 115 may be fusion-bonded to the second housing 130. At least a portion of the second protruded portion 115 may be coupled to the second housing 130 by any one method among ultrasonic welding, laser welding, and thermal welding. As a modified embodiment, the second protruded portion 115 may be fixed to the second housing 130 by an adhesive. Or, a portion of the second protruded portion 115 is fusion-bonded to the second housing 130 and the remaining portion may be bonded with an adhesive.

The length of the second protruded portion 115 in an optical axis direction may be shorter than the length of the first protruded portion 114 in an optical axis direction. The maximum length of the second protruded portion 115 in an optical axis direction may be shorter than the length of the first protruded portion 114 in an optical axis direction. The second protruded portion 115 may face at least a portion of the first protruded portion 114. The second protruded portion 115 may comprise: a second-first protruded portion facing the first-first protruded portion; a second-second protruded portion facing the first-second protruded portion; a second-third protruded portion facing the first-third protruded portion; and a second-fourth protruded portion facing the first-fourth protruded portion. The second-first to second-fourth protruded portions may be integrally formed. The second protruded portion 115 may include four corner protruded portions being disposed between the second-first to second-fourth protruded portions. The four corner protruded portions of the second protruded portion 115 may be formed at positions corresponding to the four corners of the first housing 110. The second protruded portion 115 may be spaced apart from the first protruded portion 114. The second protruded portion 115 may be spaced apart from the first protruded portion 114 in a direction perpendicular to the optical axis direction.

The second protruded portion 115 may include: a first side surface facing the first protruded portion 114; and a second side surface being disposed at an opposite side of the first side surface and in contact with the second side plate 111b. The length of the first side surface of the second protruded portion 115 in an optical axis direction may be shorter than the length of the second side surface of the second protruded portion 115 in an optical axis direction.

The second protruded portion 115 may include an inclined surface 115a. The inclined surface 115a may be inclined in a direction from a first side surface of the second protruded portion 115 toward a second side surface of the second protruded portion 115. The length of the second protruded portion 115 in the optical axis direction may be increased as it travels from the first side surface of the second protruded portion 115 toward the second side surface of the second protruded portion 115. The inclined surface 115a may be fusion-bonded to the second housing 130. At least a portion of the inclined surface 115a may be fusion-bonded to the second housing 130.

The second protruded portion 115 may be in contact with the side plate 111b. A second side surface of the second protruded portion 115 may be in contact with an inner surface of the side plate 111b. The second protruded portion 115 may not be spaced apart from the side plate 111b. The second protruded portion 115 may not be spaced apart from the side plate 111b in a direction perpendicular to the optical axis direction. The second protruded portion 115 may be extended along the inner surface of the side plate 111b.

The second protruded portion 115 may not be protruded more downward than the side plate 111b. The length of the second protruded portion 115 in an optical axis direction may be shorter than the length of the side plate 111b in an optical axis direction. The maximum length of the second protruded portion 115 in an optical axis direction may be shorter than the length of the side plate 111b in an optical axis direction. At this time, the maximum length of the second protruded portion 115 in an optical axis direction may mean the length of the second protruded portion 115 in an optical axis direction on the second side surface.

The second protruded portion 115 may be disposed between the first protruded portion 114 and the side plate 111b. The second protruded portion 115 may be disposed closer to the side plate 111b than the first protruded portion 114. The second protruded portion 115 may comprise: a second-first protruded portion being disposed on the first side plate; a second-second protruded portion being disposed on the second side plate; a second-third protruded portion being disposed on the third side plate; and a second-fourth protruded portion being disposed on the fourth side plate. The second protruded portion 115 may include a corner protruded portion being disposed between the second-first to second-fourth protruded portions. A corner protruded portion of the second protruded portion 115 may be disposed at a position corresponding to the first to fourth corners of the side plate 112.

The first housing 110 may include a barrel unit 112. The barrel unit 112 may be a lens barrel. The barrel unit 112 may be formed of a plastic material. The barrel unit 112 may be disposed in the first housing 110. The barrel unit 112 may be extended upward from an upper surface of the body part 111. The barrel unit 112 may be integrally formed with the body part 111. As a modified embodiment, the barrel unit 112 may be coupled to the body part 111. In this case, the barrel unit 112 may be fixed to the body part 111 by an adhesive. The barrel unit 112 may accommodate the lens 118 therein. The barrel unit 112 may include a hole. A lens 118 may be disposed in a hole of the barrel unit 112. An inner circumferential surface of the hole of the barrel unit 112 may be formed in a shape and size corresponding to the outer circumferential shape of the lens 118.

The first housing 110 may include the lens 118. The lens 118 may be disposed in the barrel unit 112. The lens 118 may be coupled to the barrel unit 112. The lens 118 may be disposed in a hole of the barrel unit 112. The lens 118 may include a plurality of lenses. The lens 118 may be aligned with an image sensor 142, which will be described later. The lens 118 may be optically aligned with the image sensor 142. An optical axis of the lens 118 may coincide with an optical axis of the image sensor 142. The first housing 110 may include an infrared filter (IR filter) being disposed between the lens 118 and the image sensor 142.

The camera module 100 may include a second housing 130. The second housing 130 may be named any one among a rear body, a lower housing, and a second body. The second housing 130 may be formed in a rectangular shape with an open upper portion. The second housing 130 may be formed of a plastic material. The second housing 130 may be disposed below the first housing 110. The second housing 130 may be coupled to the first housing 110. The second housing 130 may be fusion-bonded to the first housing 110. The second housing 130 may be coupled to the first housing 110 by any one among ultrasonic welding, laser welding, and thermal welding. At this time, ultrasonic fusion may mean a process in which the first housing 110 is vibrated with pressure while the second housing 130 is fixed so that the fused portion of the second housing 130 and the first housing 110 are fused and integrated. The second housing 130 may form an inner space through coupling with the first housing 110.

The second housing 130 may include a bottom plate 133. The bottom plate 133 may face the upper plate 111a of the first housing 110. The bottom plate 133 may be spaced apart from the upper plate 111a of the first housing 110 in an optical axis direction. The bottom plate 133 may be parallel to the upper plate 111a. The bottom plate 133 may be formed in a quadrangular shape. At this time, at least a portion of the corner of the bottom plate 133 may have a round shape.

The bottom plate 133 may include at least one hole (not shown). Through this, heat being generated in an inner space of the first housing 110 and the second housing 130 can be released to the outside.

The second housing 130 may include a side plate 134. The side plate 134 may be extended from the bottom plate 133. The side plate 134 may be extended from an outer edge of the bottom plate 133. A shield can 180, which will be described later, may be disposed in the side plate 134. The shield can 180 may be in surface contact with an inner surface of the side plate 134. The second housing 130 may be integrally coupled with the shield can 180 by insert molding. An upper end of the side plate 134 may be coupled to the first housing 110. An outer side surface of the side plate 134 may be disposed on the same plane as an outer side surface of the side plate 111b of the first housing 110.

The side plate 134 may include a third protruded portion 131. The third protruded portion 131 may be protruded upward from an upper end of the side plate 134. The third protruded portion 131 may be protruded upward from an upper surface of the side plate 134. The third protruded portion 131 may be in contact with the second protruded portion 115 of the first housing 110. The third protruded portion 131 may be disposed on an inclined surface 115a of the second protruded portion 115 of the first housing 110. The third protruded portion 131 may be coupled to at least a portion of the second protruded portion 115 of the first housing 110. The third protruded portion 131 may be fusion-bonded with at least a portion of the second protruded portion 115 of the first housing 110. At this time, the fusion bonding may mean any one among ultrasonic fusion, laser fusion, and thermal fusion. The third protruded portion 131 may be protruded from a partial region of an upper surface of the side plate 134. An outer surface of the third protruded portion 131 may be in contact with an inner side surface of the side plate 111b of the first housing 110. A portion of the third protruded portion 131 is in contact with the inclined surface 115a of the second protruded portion 115 of the first housing 110 by fusion, and the remaining portion of the third protruded portion 131 may be in contact the side plate 111b of the first housing 110.

The side plate 134 may include a groove 137. The groove 137 may be disposed outside the third protruded portion 131. The second protruded portion 115 of the first housing 110 may be coupled to the groove 137. Accordingly, a lower end of the first housing 110 may surround an upper end of the second housing 130.

The side plate 134 may include a hole 132. The hole 132 may be formed in the side plate 134. The hole 132 may be formed through the outer and inner surfaces of the side plate 134. At least a portion of the shield can 180 may be exposed to the outside through the hole 132. The hole 132 may expose at least a portion of the shield can 180 to the outside.

The hole 132 may be provided in plurality. For an example, five holes 132 may be spaced apart from one another on each side surface of the second housing 130. However, it is not limited thereto and may be formed and disposed in various shapes to maximize external exposure of the shield can 180. The hole 132 may be formed in an elliptical shape whose length in an optical axis direction is longer than the length in a direction perpendicular to the optical axis direction.

The second housing 130 may include a connector withdrawal part 139. The connector withdrawal part 139 may be coupled to the bottom plate 133. A connector 190 may be disposed inside the connector withdrawal part 139. The connector withdrawal part 139 may be formed of a plastic material. The connector withdrawal part 139 may include a first portion being protruded more upward than the bottom plate 133. The connector withdrawal part 139 may include a second portion being protruded more downward than the bottom plate 133. The first portion and the second portion of the connector withdrawal part 139 may be integrally formed. The length of the first portion of the connector withdrawal part 139 in an optical axis direction may be smaller than the length of the second portion of the connector withdrawal part 139 in an optical axis direction. The length of the first portion in an optical axis direction may correspond to a thickness of the bottom plate 310 of the shield can 180. An upper surface of the first portion may be disposed on the same plane with an upper surface of the bottom plate of the shield can 180. The connector withdrawal part 139 may include a space inside. The connector 190 may be disposed in the space. The space may accommodate at least a portion of the connector 190. Through this, the connector withdrawal part 139 can fix the connector 190.

The camera module 100 may include a shield can 180. The shield can 180 may be formed of a metal material. The shield can 180 may include a bottom plate 181 and a side surface plate 182. The bottom plate 181 and the side surface plate 182 may be formed as a single body.

The shield can 180 may be disposed on an inner surface of the second housing 130. A space 130a in which a substrate assembly, which will be described later, is disposed may be formed inside the second housing 130, and the shield can 180 may form an inner surface of the space 130a. The bottom plate 181 is disposed on an upper surface of the bottom plate 133 of the second housing 130, and the side surface plate 182 may be disposed on an inner surface of the side plate 134 of the second housing 130. Among the inner surfaces of the second housing 130, the region where the shield can 180 is disposed may be formed to be more recessed outward than other regions. An inner surface of the side surface plate 182 may be protruded inward from an inner surface of the side plate 134 of the second housing 130.

A hole may be formed in the bottom plate 181 so that the connector 190 penetrates from an upper surface to a lower surface.

The shield can 180 may be integrally formed with the second housing 130 made of plastic by insert molding. The shield can 180 may be disposed to be overlapped with the spacer 160 of the substrate assembly or the second printed circuit board 150, which will be described later, in a direction perpendicular to the optical axis direction.

At least a portion of the shield can 180 may be exposed to an external region of the camera module 100 through the hole 132 of the second housing 130. The shield can 180 may be coupled to the second housing 130 so as to be waterproof. Depending on the purpose, waterproofing can satisfy the waterproof and dustproof level of IP52 or higher, and can satisfy the IP69K level when being disposed outside the vehicle.

The camera module 100 may include a substrate assembly. The substrate assembly may be disposed inside the second housing 130. The substrate assembly may be disposed in an inner space formed through the coupling of the first housing 110 and the second housing 130. The substrate assembly may be disposed inside the shield can 180.

The substrate assembly may include a first substrate 140. The first substrate 140 may include a printed circuit board. The first substrate 140 may include a rigid printed circuit board. An image sensor 142 may be disposed in the first substrate 140. At this time, the first substrate 140 may be referred to as a sensor substrate. The first substrate 140 may include a first surface facing the first housing 110 and a second surface disposed at an opposite side to the first surface. The image sensor 142 may be disposed on a first surface of the first substrate 140. The first substrate 140 may be coupled to the first housing 110. The first substrate 140 may be coupled to the first protruded portion 114 of the first housing 110. An outer edge of the first surface of the first substrate 140 may be coupled to the first protruded portion 114 of the first housing 110.

The substrate assembly may include a second substrate 150. The second substrate 150 may include a printed circuit board. The second substrate 150 may include a rigid printed circuit board. The second substrate 150 may be disposed below the first substrate 140. The second substrate 150 may be spaced apart from the first substrate 140. The second substrate 150 may be spaced apart from the first substrate 140 in an optical axis direction. The second substrate 150 may supply power to the first substrate 140. The second substrate 150 may be disposed parallel to the first substrate 140. The second substrate 150 may be electrically connected to the connector 190. The second substrate 150 may include a first surface facing the first substrate 140 and a second surface being disposed at an opposite side to the second surface. The connector 190 may be disposed on a second surface of the second substrate 150. The second substrate 150 may be electrically connected to the connector 190. When an external terminal is coupled to the connector 190, power may be provided through the connector 190.

The substrate assembly may include a flexible printed circuit board 149. The flexible printed circuit board 149 may include a flexible printed circuit board (FPCB). The flexible printed circuit board 149 may electrically connect the first substrate 140 and the second substrate 150. One end of the flexible printed circuit board 149 is connected to the first substrate 140, and the other end of the flexible printed circuit board 149 may be connected to the second substrate 150. The flexible printed circuit board 149 may have elasticity.

The substrate assembly may include a spacer 160. The spacer 160 may also be referred to as a shield can. The spacer 160 may also be referred to as an electromagnetic wave shielding member. The spacer 160 may block electromagnetic interference (EMI) or electromagnetic waves. The spacer 160 may space a plurality of substrates apart in an optical axis direction. The spacer 160 may be formed of a metal material. For an example, the material of the spacer 160 may include aluminum (Al).

The spacer 160 may be referred to as a first shield can, and in this case, the shield can 180 may be referred to as a second shield can. The spacer 160 may be disposed below the first substrate 140. The spacer 160 may be disposed above the second substrate 150. The spacer 160 may be disposed between the first substrate 140 and the second substrate 150. The spacer 160 may space the first substrate 140 and the second substrate 150 apart.

The spacer 160 has a space in which the first substrate 140 and the second substrate 150 are disposed, and at least one protrusion for contacting with the shield can 180 may be provided on an outer surface of the spacer 160. For an example, the protrusions may be disposed on outer surfaces of three of the four regions forming sides of the spacer 160. The protrusion may be formed to be protruded outward from other regions on an outer surface of the spacer 160. Through the protrusion, the spacer 160 may come into contact with the shield can 180 to dissipate heat generated by driving the substrate assembly.

The spacer 160 may have a rectangular cross section with open upper and bottom surfaces. The spacer 160 may include a first plate part 161, a second plate part 162, a third plate part 163, and a fourth plate part 164. The spacer 160 may be formed by coupling the first to fourth plate parts 161, 162, 163, and 164. The first to fourth plate parts 161, 162, 163, and 164 may be formed as a single body. The first to fourth plate parts 161, 162, 163, and 164 may form four sides of the spacer 160.

The first plate part 161 and the third plate part 163 may be disposed to face each other. The second plate part 162 and the fourth plate part 164 may be disposed to face each other. The first plate part 161 is disposed adjacent to the second plate part 162 and the fourth plate part 164; the second plate part 162 is disposed adjacent to the first plate part 161 and the third plate part 163; the third plate part 163 is disposed adjacent to the second plate part 162 and the fourth plate part 164; and the fourth plate part 164 may be disposed adjacent to the first plate part 161 and the third plate part 163.

The first to fourth plate parts 161, 162, 163, and 164 may be interconnected through a connecting portion 174. The connecting portion 174 may be disposed in each corner region of the spacer 160 to interconnect adjacent plate parts. The connecting portion 174 may form a lower surface of the spacer 160. The connecting portion 174 may include a curved surface. The connecting portion 174 may be disposed on an upper surface of the second substrate 150. The connecting portion 174 may press the second substrate 150 downward.

The first plate part 161 may include a first groove 161a. The first groove 161a may be disposed on an upper end of the first plate part 161. The first groove 161a may have a shape in which a portion of an upper surface of the first plate part 161 is depressed downward. At least a portion of the flexible printed circuit board 149 may be disposed outside the first plate part 161. At least a portion of the flexible printed circuit board 149 may be overlapped with the first plate part 161 in a horizontal direction. At least a portion of the flexible printed circuit board 149 may be disposed inside the first groove 161a. One end of the flexible printed circuit board 149 may be electrically connected to the first printed circuit board 140 through the first groove 161a.

The spacer 160 may include a lower plate portion 165. The lower plate portion 165 may be bent inward from a lower end of the first plate part 161. The lower plate portion 165 may be disposed perpendicular to the first to fourth plate parts 161, 162, 163, and 164. A lower surface of the lower plate portion 165 may face an upper surface of the second substrate 150. A lower surface of the lower plate portion 165 may be in contact with an upper surface of the second substrate 150. Unlike this, a lower surface of the lower plate portion 165 may be spaced apart from an upper surface of the second substrate 150 by a predetermined distance. A lower surface of the lower plate portion 165 may form the same plane as the lower surface of the connecting portion 174. A portion of the open lower surface of the spacer 160 may be covered by the lower plate portion 165.

Each of the second to fourth plate parts 162, 163, and 164 may include a first region and a second region. For example, the second plate part 162 and the fourth plate part 164 may include a first region 170 and a second region 172, and the third plate part 163 may also include a first region 166 and a second region 168a. The second region may be disposed at a lower portion of the first region. The first region and the second region may be interconnected through a connecting portion. The first region and the second region may be disposed to have a step. The first region may be disposed relatively more inward than the second region to have a step. The second region may be disposed relatively more outwardly than the first region to have a step. In this case, the first region and the second region may not be overlapped with each other in an optical axis direction. A connecting portion connecting the first region and the second region may be formed to be inclined outward as it travels downward.

The third plate part 163 may include a first region 166 and a second region 168. The third plate part 163 may include a first coupling part 168a. The first coupling part 168a may be formed such that a portion of a lower end of the second region 168 is protruded downward. The first coupling part 168a may be disposed at the center of a lower end of the second region 168. The first coupling part 168a may include a first coupling hole 169 penetrating an outer surface from an inner surface. A portion of the second substrate 150 may be disposed in the first coupling hole 169. A rib being coupled to the first coupling hole 169 may be formed on a side surface of the second substrate 150. The second substrate 150 may be fit-coupled into the first coupling hole 169 through the rib and fixed inside the spacer 160.

The third plate part 163 may include a first protrusion 167. The first protrusion 167 may be disposed in the first region 166. The first protrusion 167 may be formed by cutting a portion of the first region 166 or a region combining the first region 166 and the connecting portion. The first protrusion 167 may be formed by cutting a portion of the first region 166 and pressing the cut region outward. An upper end of the first region 166 may be divided into a plurality of regions by the incision region.

The first protrusion 167 may be disposed at the center of the third plate part 163 in a direction perpendicular to the optical axis direction.

The first protrusion 167 may be more protruded outward than an outer surface of the third plate part 163. The first protrusion 167 may be formed to be protruded outward from the third plate part 163 while its lower end is coupled to an upper end of the second region 169. The first protrusion 167 may have a predetermined elastic force. For example, the first protrusion 167 may have elasticity in a direction being protruded outward of the spacer 160. The first protrusion 167 may have elasticity in a direction of pressing an inner surface of the shield can 180.

The first protrusion 167 may have a region being bent at least once. The region being bent may be disposed between an upper end and a lower end of the first protrusion 167. The region being bent may be disposed more outward than other regions. The region being bent may be in contact with an inner surface of the shield can 180.

Since the second plate part 162 and the fourth plate part 164 have the same configuration and function, hereinafter, the second plate part 162 and the fourth plate part 164 will be described based on the second plate part 162.

The second plate part 162 may include a first region 170 and a second region 172. The second plate part 162 may include a second protrusion 171. The second protrusion 171 may be disposed in the first region 170. The second protrusion 171 may be formed by cutting a portion of the first region 170 or a region combining the first region 170 and the connecting portion. The second protrusion 171 may be formed by cutting a portion of the first region 170 and pressing the cut region outward. The upper end of the first region 170 may be partitioned into a plurality of regions by the cut region.

The second protrusion 171 may be more protruded outward than an outer surface of the second plate part 162. The second protrusion 171 may be formed to be protruded outward from the third plate part 163 while its lower end is coupled to an upper end of the second region 169. The second protrusion 171 may have a predetermined elastic force. For example, the second protrusion 171 may have elasticity in a direction being protruded outward of the spacer 160. The second protrusion 171 may have elasticity in a direction of pressing an inner surface of the shield can 180.

The second protrusion 171 may have a region being bent at least once. The region being bent may be disposed between an upper end and a lower end of the second protrusion 171. The region being bent may be disposed more outward than other regions. The region being bent may be in contact with an inner surface of the shield can 180.

The second plate part 162 may include a third protrusion 176. In detail, the third protrusion 176 may be formed by cutting a portion of the second region 172. Due to the region being cut for forming the third protrusion 176, a hole 175 penetrating an inner surface from an outer surface may be formed in the second region 172. The third protrusion 176 may have a shape in which the remaining region is protruded outward from the second plate part 162 while the one end is coupled to the inner circumferential surface of the hole 175. For an example, a lower end of the third protrusion 176 may be coupled to an inner circumferential surface of the hole 175, and the remaining region may be protruded more outward than an outer surface of the second plate part 162.

The third protrusion 176 may have a predetermined elastic force. For example, the third protrusion 176 may have elasticity in a direction being protruded outward of the spacer 160. The third protrusion 176 may have elasticity in a direction of pressing an inner surface of the shield can 180.

The third protrusion 176 may have a region being bent at least once. The region being bent may be disposed between an upper end and a lower end of the third protrusion 176. The region being bent may be disposed more outward than other regions. The region being bent may be in contact with an inner surface of the shield can 180.

The second protrusion 171 and the third protrusion 176 may be spaced apart from each other by a predetermined distance in an up and down direction (optical axis direction). At least a portion of the second protrusion 171 and the third protrusion 176 may be overlapped with each other in an up and down direction. Each of the second protrusion 171 and the third protrusion 176 may have a region in which at least a portion is not overlapped with each other in an up and down direction. The second protrusion 171 and the third protrusion 176 may be disposed to have a step in a direction perpendicular to the optical axis direction. Accordingly, a contact area between the shield can 180 and the spacer 160 may be formed to be wide.

The second plate part 162 may include a fourth protrusion 178. The fourth protrusion 178 may be formed to be protruded inward from an inner surface of the spacer 160. At least a portion of the fourth protrusion 178 has a region parallel to the second substrate 150 and may support the second substrate 150. The fourth protrusion 178 may support a lower surface of the second substrate 150. The fourth protrusion 178 may be disposed inside the second region 172. The fourth protrusion 178 may be protruded more inward than an inner surface of the second region 172.

In detail, the fourth protrusion 178 may be formed as a region extended from a lower end of the second plate part 162 is bent upward. The fourth protrusion 178 may include an inclined portion 178a being bent upward from a lower end of the second region 172, and a horizontal portion 178b being bent outward from an end portion extended of the inclined portion 178a and being coupled to the second coupling hole 173. The horizontal portion 178b may be disposed parallel to the second substrate 150. The horizontal portion 178b may support a lower surface of the second substrate 150. The horizontal portion 178b may be in contact with a lower surface of the second substrate 150. The inclined portion 178a may be formed in a shape in which a distance to an inner surface of the second region 172 increases as it travels upward.

Meanwhile, the second plate part 162 may include a second coupling hole 173 penetrating through an inner surface from an outer surface, and an end portion of the fourth protrusion 178 may be coupled to the second coupling hole 173. A region of the fourth protrusion 178 being coupled to the second coupling hole 173 may be an end portion of the horizontal portion 178b. The second coupling hole 173 may be spaced apart from the hole 175 in a direction perpendicular to the optical axis direction. The second coupling hole 173 may be disposed to be overlapped with the hole 175 in a direction perpendicular to the optical axis direction.

Meanwhile, in the present embodiment, it is exemplified that protrusions inside the spacer 160 are disposed in the second plate part to the fourth plate part 162, 163, and 164, but is not limited thereto, and the protrusion may also be disposed on the first plate part 161. In this case, the protrusion in the first plate part 161 may be disposed on an outer surface of the first plate part 161 that is avoided with a region in which the flexible printed circuit board 149 being disposed.

According to the above configuration, since the spacer 160 has a plurality of contact structures with the shield can 180, there is an advantage of improving heat dissipation efficiency even if the housings 110 and 130 are made of plastic.

That is, in a structure in which the second housing 130 is formed of a plastic material and the shield can 180 is formed of a metal material, the heat dissipation efficiency is improved by exposing at least a portion of the shield can 180 to the outside of the camera module 100, and at the same time, by having a structure in which the spacer 160 has a contact structure with the shield can 180 being exposed to the outside through a plurality of protrusions, there is an advantage in that the heat generated in the camera module 100 can be more easily released to the outside.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:
1. A camera module comprising:
a first housing including a lens;
a second housing coupled to the first housing;
a substrate assembly disposed inside a space formed by coupling the first housing and the second housing; and
a shield can disposed inside the second housing,
wherein the substrate assembly includes at least one substrate and a spacer disposed outside the substrate,
wherein the spacer includes a plurality of protrusions protruded from an outer surface and in contact with the shield can,
wherein the spacer comprises:
a first plate part;

a second plate part disposed adjacent to the first plate part;
a third plate part disposed adjacent to the second plate part and facing the first plate part; and
a fourth plate part disposed adjacent to the third plate part and facing the second plate part, and
wherein at least one among the first to the fourth plate parts includes a second protrusion protruded outward from an outer surface and a third protrusion disposed below the second protrusion and protruded outward from an outer surface.

2. The camera module according to claim 1, wherein the protrusions are respectively disposed in at least three plate parts among the first to fourth plate parts.

3. The camera module according to claim 1, wherein the substrate assembly comprises:
a first substrate in which an image sensor is disposed;
a second substrate spaced apart from the first substrate in an optical axis direction and coupled to a connector; and
a flexible printed circuit board connecting the first substrate and the second substrate.

4. The camera module according to claim 3, wherein the third plate part includes a first protrusion protruded from an outer surface, and a first coupling hole disposed below the first protrusion and penetrating the outer surface from an inner surface to which the side surface of the second substrate is coupled.

5. The camera module according to claim 3, wherein at least a portion of the flexible printed circuit board is disposed outside the first plate part.

6. The camera module according to claim 3, wherein a lower plate part is bent inward from a lower end of the first plate part so that a lower surface faces an upper surface of the second substrate.

7. The camera module according to claim 1, wherein the second plate part includes the second protrusion, and
wherein the fourth plate part includes the third protrusion.

8. The camera module according to claim 7, wherein the second protrusion and the third protrusion are disposed to have a step in a direction perpendicular to the optical axis direction.

9. The camera module according to claim 7, wherein at least a portion of the second protrusion and the third protrusion overlap in an optical axis direction.

10. The camera module according to claim 7, wherein the second plate part and the fourth plate part each includes a fourth protrusion bent inwardly, and
wherein the fourth protrusion is spaced apart from the third protrusion in an optical axis direction, and an upper surface of the fourth protrusion supports a lower surface of the second substrate.

11. The camera module according to claim 10, wherein the second plate part and the fourth plate part each includes a second coupling hole to which the fourth protrusion is coupled.

12. The camera module according to claim 1, wherein each of the second plate part and the fourth plate part includes a first region in which the second protrusion is disposed and a second region being formed below the first region and in which the third protrusion is disposed, and
wherein the first region is disposed more inward than the second region to have a step.

13. The camera module according to claim 1, wherein the spacer and the shield can are made of metal, and
wherein the second housing is made of a plastic material.

14. The camera module according to claim 13, wherein the second housing includes a hole exposing at least a portion of the shield can to an outside.

15. The camera module according to claim 14, wherein the second housing and the shield can are integrally formed by insert injection molding.

16. A camera module comprising:
a first housing including a lens;
a second housing coupled to the first housing;
a substrate assembly disposed inside a space formed by the coupling of the first housing and the second housing; and
a shield can disposed inside the second housing,
wherein the substrate assembly includes at least one substrate and a spacer disposed outside the substrate,
wherein the shield can is formed of a metal material,
wherein the second housing is formed of a plastic material,
wherein the shield can and the second housing are integrally formed by insert injection,
wherein the spacer includes four plate parts,
wherein at least one plate part among the four plate parts includes a plurality of protrusions being in contact with the shield can,
wherein the spacer comprises:
a first plate part;
a second plate part disposed adjacent to the first plate part;
a third plate part disposed adjacent to the second plate part and facing the first plate part; and
a fourth plate part disposed adjacent to the third plate part and facing the second plate part, and
wherein the at least one among the first to the fourth plate parts includes a second protrusion protruded outward from an outer surface and a third protrusion disposed below the second protrusion and protruded outward from an outer surface.

17. The camera module according to claim 16, wherein the substrate assembly comprises:
a first substrate in which an image sensor is disposed;
a second substrate spaced apart from the first substrate in an optical axis direction and coupled to a connector; and
a flexible printed circuit board connecting the first substrate and the second substrate.

18. The camera module according to claim 17, wherein at least one of the four plate parts includes a first protrusion protruded from an outer surface, and a first coupling hole disposed below the first protrusion and penetrating the outer surface from an inner surface to which a side surface of the second substrate is coupled.

19. The camera module according to claim 16, wherein the second housing includes a hole exposing at least a portion of the shield can to the outside.

* * * * *